(12) United States Patent
Hashizume et al.

(10) Patent No.: US 7,650,245 B2
(45) Date of Patent: Jan. 19, 2010

(54) IMPULSE LINE-CLOGGING DETECTING UNIT AND IMPULSE LINE-CLOGGING DETECTING METHOD

(75) Inventors: Takumi Hashizume, Chiba (JP); Tetsuya Wakui, Osaka (JP); Jyun-ichi Eino, Tokyo (JP); Nobuo Miyaji, Tokyo (JP); Yoshitaka Yuki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 212 days.

(21) Appl. No.: 11/861,215

(22) Filed: Sep. 25, 2007

(65) Prior Publication Data

US 2008/0208504 A1    Aug. 28, 2008

(30) Foreign Application Priority Data

Feb. 26, 2007   (JP) .............................. 2007-045294

(51) Int. Cl.
*G06F 19/00* (2006.01)
*G01B 5/28* (2006.01)

(52) U.S. Cl. .................... 702/35; 702/100; 702/195; 73/40.5 R; 73/592; 73/611; 340/606

(58) Field of Classification Search .................. 702/35, 702/100, 195; 73/40.5 R, 592, 611, 622; 340/606

See application file for complete search history.

(56) References Cited

U.S. PATENT DOCUMENTS 7,254,518 B2 * 8/2007 Eryurek et al. .............. 702/183

7,260,496 B2 * 8/2007 Hashizume et al. ......... 702/138
7,523,667 B2 * 4/2009 Brown et al. .................. 73/592

FOREIGN PATENT DOCUMENTS

| JP | 2004-132817 A | 4/2004 |
|----|---------------|--------|
| JP | 2004-294175 A | 10/2004 |

\* cited by examiner

*Primary Examiner*—Edward Raymond
*Assistant Examiner*—Elias Desta
(74) *Attorney, Agent, or Firm*—Sughrue Mion, PLLC (57) ABSTRACT

An impulse line-clogging detecting apparatus. The apparatus is provide with: a differential pressure detecting unit that detects a differential pressure of a fluid, and outputs time-series data of the differential pressure. Fluctuations are determined by a differential pressure fluctuation calculating unit that calculates a differential pressure fluctuation, and a fluctuation variance calculating unit that calculates a variance of the differential pressure fluctuation. Based upon the calculated variance, a variance ratio calculating unit calculates a variance ratio of the differential pressure fluctuation variance to a differential pressure fluctuation variance obtained in advance in a normal state of the high and low pressure side impulse lines. A variance ratio correcting unit calculates a correction value for suppressing a change of the variance ratio. Finally; a clogging determining unit determines whether the high and low pressure side impulse lines are clogged, based on the variance ratio corrected by the variance ratio correcting unit.

5 Claims, 4 Drawing Sheets

IMPULSE LINE-CLOGGING DETECTING UNIT AND IMPULSE LINE-CLOGGING DETECTING METHOD

BACKGROUND OF THE INVENTION

Priority is claimed on Japanese Patent Application No. 2007-045294, filed Feb. 26, 2007, the contents of which at incorporated herein by reference.

1. Field of the Invention

The present invention relates to an impulse line-clogging detecting apparatus and an impulse line-clogging detecting method for detecting clogging of impulse lines in a differential pressure transmitter for measuring a differential pressure of fluid flowing through a piping.

2. Description of Related Art

As is generally known in the related art, a differential pressure transmitter measures a differential pressure between a front stage (high pressure side) and a rear stage (low pressure side) of an orifice provided in a pipe in which fluid flows, based on a pressure transmitted through impulse lines arranged at the front and rear stages of the orifice. If the impulse lines are clogged in such a differential pressure transmitter, it is difficult to measure the differential pressure precisely. Accordingly, it is very important to detect clogging of the impulse lines from a standpoint of fluid management (for example, see Japanese Unexamined Patent Application, First Publication No. 2004-132817). Hereinafter, an example of a conventional method of detecting clogging of an impulse line will be described.

In a normal state (i.e., a state where an impulse line is not clogged), assuming that differential pressure data obtained in time-series from a differential pressure transmitter is Dps(i), differential pressure fluctuation Fdps(i) is expressed by the following equation (1). In the equation (1), Dps(i) is a current value of differential pressure data and Dps(i−1) is a previous value of differential pressure data. A variance (square mean value) Vas of differential pressure fluctuation Fdps(i) is expressed by the following equation (2). In the equation (2), N is the total number of samples of differential pressure data Dps(i). Hereinafter, Vas is referred to as a standard fluctuation variance. The standard fluctuation variance Vas is beforehand obtained in the first step of at actual operation in the normal state.

$$Fdps(i)=Dps(i)-Dps(i-1) \quad (1)$$

$$Vas=\Sigma\{Fdps(i)^2\}/N \quad (2)$$

$$Fdps(i)=Dps(i)-2Dps(i-1)+Dps(i-2) \quad (3)$$

Next, in an at operation of a plant whenever diagnosis time for impulse lines comes, by using differential pressure data Dp(i) obtained in time-series from a differential pressure transmitter, a differential pressure fluctuation Fdp(i) and a differential pressure fluctuation variance Va are obtained in the same way as the above. The differential pressure fluctuation Fdp(i) and the differential pressure fluctuation variance Va in the actual operation are calculated based on the above equations (1) and (2).

Then, a ratio D (=√(Va/Vas)) of the differential pressure fluctuation variance Va obtained in the diagnosis time for the impulse lines to the beforehand obtained standard fluctuation variance Vas is calculated. Since the differential pressure fluctuation variance Va is varied depending on conditions of clogging of the impulse lines, the clogging of the impulse lines can be detected based on the variation of the ratio D. For example, if both of high and low pressure side impulse lines are clogged the differential pressure fluctuation variance Va becomes small (the ratio D also becomes smaller). If one of the high and low pressure side impulse lines is clogged, the differential pressure fluctuation variance Va comes large (the ratio D also becomes larger). In addition, if the impulse lines are in a normal state, the differential pressure fluctuation variance Va approaches the standard fluctuation variance Vas and the ratio D approaches "1". Accordingly, by comparing the ratio D with a predetermine threshold value, it can be determined whether one or both of the high and low pressure impulse lines are clogged, or the high and low pressure impulse lines am in the normal state.

The differential pressure fluctuation may be obtained using the equation (3) instead of the equation (1). For example, when the differential pressure fluctuation is obtained using the equation (1), if transitional change (rising or falling) occurs in a differential pressure, the transitional change component may appear as fluctuation. To overcome this problem, the equation (3) is used to remove the transitional change component even if the transitional change occurs in the differential pressure thereby making it possible to detect only a real fluctuation component (for example, see Japanese Unexamined Patent Application, First Publication No. 2004-294175).

In the mean time, the differential pressure fluctuation variance is varied depending on a flow rate as well as clogging of an impulse line. Accordingly, since the standard fluctuation variance Vas is an experimental value under the condition of fixed flow rate, if the flow rate is varied in an actual operation, the ratio D is also varied even in the same clogging of the impulse line. That is, since it is require to change a threshold value or a setting value of the standard fluctuation variance Vas depending on the flow rate, a work load of an operator increases, and apparatus costs increase when the change of the setting value is automated.

The present invention was made in view of the above-mentioned circumstances and has an object of detecting clogging of impulse lines precisely without being influenced by a flow rate of a fluid.

SUMMARY OF THE INVENTION

The present invention has employed the followings in order to achieve the above-object.

That is, the present invention employs an impulse line-clogging detecting apparatus provided with: a differential pressure detecting unit that detects a differential pressure of a fluid based on a high pressure transmitted via a high pressure side impulse line and a low pressure totted via a low pressure side impulse line, and outputs time-series data of the differential pressure; a differential pressure fluctuation calculating unit that calculates a differential pressure fluctuation based on the time-series data of the differential pressure; a fluctuation variance calculating unit that calculates a variance of the differential pressure fluctuation; a variance ratio calculating unit that calculates a variance ratio of the differential pressure fluctuation variance calculated by the fluctuation variance calculating unit to a differential pressure fluctuation variance obtained in advance in a normal state of the high pressure side impulse line and the low pressure side impulse line; a variance ratio correcting unit that calculates a correction value for suppressing change of the variance ratio, which is caused by change of a flow rate of the fluid, based on the differential pressure time-series data output from the differential pressure detecting unit and time-series data of the differential pressure obtained in advance in the normal state, and corrects the variance ratio based on the correction value; and a clogging determining unit that determines whether the high pressure side impulse line and the low pressure side impulse line are clogged, based on the variance ratio corrected by the variance ratio correcting unit.

It may be arranged such that the variance ratio correcting unit calculates a ratio (Adps/Adp) of a differential pressure time-series data mean value (Adps) obtained in advance in the normal state to a differential pressure time-series data mean value (Adp) output from the differential pressure detecting unit, as a correction value, and corrects the variance ratio by multiplying the variance ratio by the correction value.

It may be arranged such that: the differential pressure detecting unit compares the detected differential pressure with a predetermined threshold value, and outputs time-series data having a differential pressure larger than the threshold value; the differential pressure time-series dam obtained in advance in the normal state has a value larger man the threshold value; and the variance of the differential pressure fluctuation obtained in advance in the normal state is calculated based on the differential pressure time-series data which is obtained in advance in the normal state and has the differential pressure larger than the threshold value.

It may be arranged such that the differential pressure fluctuation calculating unit calculates differential se fluctuation (Fdp(i)) using one of the following equations (11), (12) and (13) each constituted by a current value (Dp(i)), last value (Dp(i−1)) and time before last value (Dp(i−2)) in the differential pressure time-series data.

$$Fdp(i)=\{Dp(i)-2\cdot Dp(i-1)+Dp(i-2)\}/Dp(i) \quad (11)$$

$$Fdp(i)=\{Dp(i)-2\cdot Dp(i-1)+Dp(i-2)\}/Dp(i-1) \quad (12)$$

$$Fdp(i)=\{Dp(i)-2\cdot Dp(i-1)+Dp(i-2)\}/Dp(i-2) \quad (13)$$

In addition, the present invention also employs an impulse line-logging detecting method including: a first step of detecting a differential pressure of a fluid based on a high pressure transmitted via a high pressure side impulse line and a low pressure transmitted via a low pressure side impulse line, and outputting time-series data of the differential pressure; a second step of calculating differential pressure fluctuation based on the time-series data of the differential pressure; a third step of calculating a variance of the differential pressure function; a fourth step of calculating a variance ratio of the differential pressure fluctuation variance calculated in the third step to a differential pressure fluctuation variance obtained in advance in a normal state of the high and low pressure side impulse lines; a fifth stop of calculating a correction value for suppressing change of the variance ratio, which is caused by change of a flow rate of the fluid, based on the differential pressure time-series data acquired in the first step and time-series data of the differential pressure obtained in advance in the normal state; a sixth step of correcting the variance ratio based on the correction value; and a seventh step of determining whether the high pressure side impulse line and the low prize side impulse line a clogged, based on the variance ratio corrected the sixth step.

According to the present invention, by obtaining the correction value for suppressing change of the variance ratio, which is caused by change of a flow rate of fluid, and correcting the variance ratio wing using correction value, it is possible to detect the state of clogging of the impulse lines precisely without being affected by the flow rate of the fluid.

DETAILED DESCRIPTION OF THE INVENTION

Hereinafter, preferred embodiments of the present invention will be described with reference to the accompanying drawings.

First Embodiment

Figure 1:
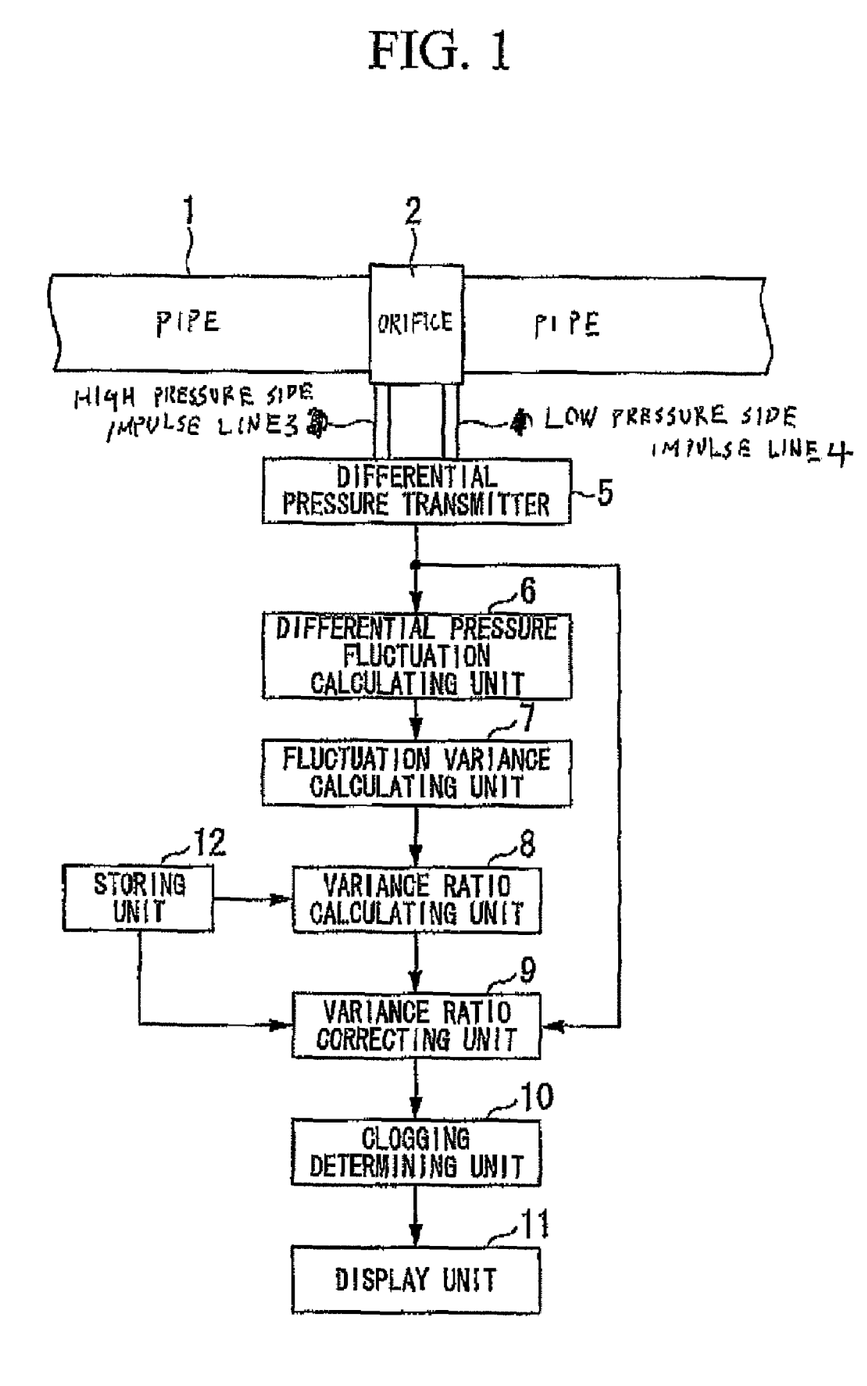
FIG. 1 is a schematic view showing a configuration of an impulse line-clogging detecting apparatus according to a first embodiment of the present invention.

FIG. 1 is a schematic view showing a configuration of an impulse line-clogging detecting according to a first embodiment of the present invention. This impulse line-clogging detect apparatus detects clogging of a high pressure side impulse line 3 and a low pressure side impulse line 4, which are respectively arranged at a front stage (high pressure side) and a rear stage (low pressure side) of an orifice 2 provided in a fluid pipe 1 of a plant or the like.

As shown in FIG. 1, the impulse line-clogging detecting apparatus includes a differential pressure transmitter (differential pressure detecting unit) 5, a differential pressure fluctuation calculating unit 6, a fluctuation variance calculating unit 7, a variance ratio calculating unit 9, a variance ratio correcting unit 9, a clogging determining unit 10, a display unit 11, and a storing unit 12.

The differential pressure transmitter 5 detects a differential pressure of fluid based on high pressure transmitted via the high pressure side impulse line 3 and low pressure transmitted via the low pressure side impulse line 4 and outputs differential pressure data Dp(i), which is time-series data representing this differential pressure, to the differential pressure fluctuation calculating unit 6 and the variance ratio correcting unit 9. The differential pressure fluctuation calculating unit 6 calculates differential pressure fluctuation Fdp(i) from the following equation (4) based on the differential pressure data Dp(i) obtained in time-series from the differential pressure Bitter 5, and outputs the obtained differential pressure fluctuation Fdp(i) to the fluctuation variance calculating unit 7. In the equation (4), Dp(i) is a current value of differential pressure data, and Dp(i−1) is a previous value of differential pressure data.

$$Fdp(i)=Dp(i)-Dp(i-1) \quad (4)$$

The fluctuation variance calculating unit 7 calculates a variance Va (square mean value) of the differential pressure fluctuation Fdp(i) obtained from the differential pressure fluctuation calculating unit 6, based on the following equation (5), and outputs the obtained differential pressure fluctuation variance Va to the variance ratio calculating unit 8. In the equation (5), N is the total number of samples of the differential pressure data Dp(i). The variance ratio calculating unit 8 calculates a we ratio D of the differential pressure fluctuation variance Va, which is obtained from the fluctuation variance calculating unit 7, to a standard fluctuation variance Vas in the normal state of the high and low pressure side impulse lines 3 and 4, which is pre-stored in the storing unit 12, based on the following equation (6), and outputs the calculated variance ratio D to the vice ratio correcting unit 9.

$$Va = \Sigma\{Fdp(i)^2\}/N \quad (5)$$

$$D = \sqrt{(Va/Vas)} \quad (6)$$

The variance ratio correcting unit 9 calculates a differential pressure data mean value Adp from the following equation (7) based on the differential pressure data Dp(i) obtained in time-series from the differential pressure transmitter 5, and also calculates a ratio of a differential pressure data mean value (standard differential pressure mean value) Adps in the normal state of the high and low pressure side impulse lines 3 and 4, which is pre-stored in the storing unit 12, to the above-calculated differential pressure data mean value Adp, as a correction value k (=Adps/Adp). The correction value k is a correction value for suppressing change of the variance ratio D, which is caused by change of a flow rate of fluid flowing through the pipe 1. The variance ratio correction unit 9 calculates a correction variance ratio Dcomp by multiplying the variance ratio D, which is obtained from the variance ratio correcting unit 9, by the correction value k, bard on the following equation (8), and outputs the calculated correction variance ratio Dcomp to the clogging determining unit 10.

$$Adp = \Sigma\{Dp(i)\}/N \quad (7)$$

$$Dcomp = k \cdot D = (Adps/Adp) - D \quad (8)$$

The clogging determining unit 10 compares the correction variance ratio Dcomp with a predetermined threshold value to determine whether or not the high and low pressure side impulse lines 3 and 4 are clogged, and outputs a result of the determination to the display unit 11. The display unit 11, which is, for example, a liquid crystal display device, displays the result of the determination by the clogging determining unit 10. The storing unit 12 pre-stores the standard fluctuation variance Vas and the standard differential pressure mean value Adps in the normal state of the high and low pressure side impulse lines 3 and 4.

Next, an operation of the impulse line-clogging detecting apparatus as constructed above will be described.

<Setting of Standard Fluctuation Variance Vas and Standard Differential Pressure Mean Value Adps>

To begin with, in the normal state of the high and low pressure side impulse lines 3 and 4 (that is, a state where the impulse lines are not clogged), it is required to beforehand obtain the standard fluctuation variance Vas and the standard differential pressure mean value Adps in the firsts step of an actual operation, based on the differential pressure data obtained in time-series from the differential pressure transmitter 5, and to store the obtained Vas and Adps in the storing unit 12. Specifically, in the normal state, under the condition of fixed flow rate, that the differential pressure data obtained in time-series from the differential pressure transmitter 5 is Dps(i), the differential pressure fluctuation Fdps(i) is expressed by the above equation (1). In the mean time, the variance (standard fluctuation variance) Vas of the differential pressure fluctuation Fdps(i) is expressed by the above equation (2). In addition, the standard differential pressure mean value Adps is expressed by the following equation (9). Based on these equations (1), (2) and (9), the standard fluctuation variance Vas and the standard differential pressure mean value Adps are obtained and pre-stored in the storing unit 12.

$$Adps = \Sigma\{Dps(i)\}N \quad (9)$$

<Clogging Determination in Actual Operation>

Figure 2:
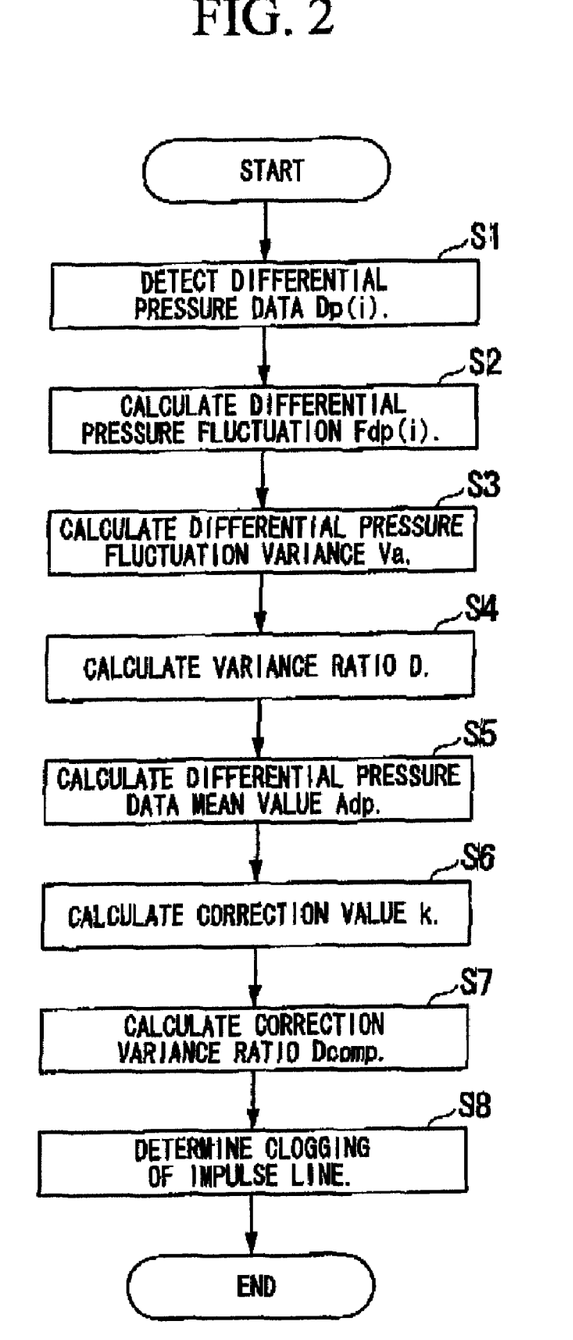
FIG. 2 is a flow chart illustrating an operation of the impulse line-clogging detecting apparatus.

FIG. 2 is a flow chart illustrating an operation of determining whether or not impulse lines we clogged in an actual operation of a plant. The flow chart illustrated in FIG. 2 is performed whenever diagnosis time for the impulse lines comes. First, the differential pressure transmitter 5 detects a differential pressure of fluid based on high pressure transmitted via the high pressure side impulse line 3 and low pressure transmitted via the low pressure side impulse line 4, and outputs differential pressure data Dp(i), which is time-series data representing this differential pressure, to the differential pressure fluctuation calculating unit 6 and the variance ratio correcting unit 9 (Step S1). The differential pressure fluctuation calculating unit 6 calculates differential pressure fluctuation Fdp(i) from the above equation (4) based on the differential pressure data Dp(i) obtained in dime-series from the differential pressure transmitter 5, and outputs the obtained differential pressure fluctuation Fdp(i) to the fluctuation variance calculating unit 7 (Step S2).

Next, the fluctuation variance calculating unit 7 calculates a variance Va of the differential pressure fluctuation Fdp(i) obtained from the differential pressure fluctuation calculating unit 6, based on the above equation (5), and outputs the obtained differential pressure fluctuation variance Va to the variance ratio calculating unit 8 (Step S3). Next, the variance ratio calculating unit 8 calculates a variance ratio D of the differential pressure fluctuation variance Va, which is obtained from the fluctuation vice calculating unit 7, to a standard fluctuation variance Vas in the normal state of the high and low pressure side impulse lines 3 and 4, which is pre-stored in the storing unit 12, bard on the above equation (6), and outputs the calculated variance ratio D to the variance ratio correcting unit 9 (Step S4).

Subsequently, the variance ratio correcting unit 9 calculates a differential pressure data mean value Adp from the above equation (7) based on the differential pressure data Dp(i) obtained in time-series from the differential pressure transmitter 5 (Step S5). Also, the variance ratio correcting unit 9 calculates a ratio of a standard differential pressure mean value Adps in the normal state of the high and low pressure side impulse lines 3 and 4, which is pre-stored in the storing unit 12, to the above-calculated differential pressure data mean value Adp, as a correction value k (=Adps/Adp) (Step S6). Also, the variance ratio correcting unit 9 calculates a correction variance ratio Dcomp by multiplying the variance ratio D, which is obtained from the variance ratio correcting unit 9, by the correction value k based on the above equation (8), and outputs the calculated correction variance ratio Dcomp to the clogging determining with 10 (Step S7).

As described above, the differential pressure fluctuation on variance varies depending on the flow rate as well as the clogging of the impulse lines. For example, as the flow rate increases, the differential pressure fluctuation variance Va increases, and accordingly the variance ratio D increases. In the mean time, as the flow rate increases, the differential pressure increase (in other words the differential pressure data mean value Adp increases), the correction value k decreases. In this manner, the correction value k becomes a value for suppressing change of the variance ratio D, which is caused by change of a flow rate of fluid flowing through the pipe 1. Accordingly, the correction variance ratio Dcomp obtained from the above equation (8) becomes a value in which the effect of the change of the flow rate on the variance ratio D is corrected.

Next, the clogging determining unit 10 compares the correction variance ratio Dcomp with a predetermined threshold value to determine whether or not the high and low pressure side impulse lines 3 and 4 are clogged, and outputs a result of the determination to the display unit 11 (Step S8). Details of a method of determining the clogging of the impulse lines 3 and 4 are the same as those in the related art. For example, when the correction variance ratio Dcomp is compared with a first threshold value (for example, 3) and a second threshold value (for example, 0.3), if the correction variance ratio Dcomp is equal to or larger than the first threshold value, it is determined that one of the high and low pressure side impulse lines 3 and 4 is clogged. If the correction variance ratio Dcomp is equal to or smaller than the second threshold value, it is determined that both of the high and low pressure side impulse lines 3 and 4 are clogged. If the correction variance ratio Dcomp is larger than the second threshold value and smaller than the first threshold value, it is determined that the high and low pressure side impulse lines 3 and 4 are in the normal state. The display unit 11 displays the state of clogging of the high and low pressure side impulse lines 3 and 4 based on a result of the determination by the clogging determining unit 10.

As described above, with the impulse line-clogging detecting apparatus according to the first embodiment, by obtaining the correction value k for suppressing the change of the variance ratio D, which is caused by the change of the flow rate of fluid flowing through the pipe 1, and by correcting the variance ratio D using the correction value k, it is possible to detect the state of clogging of the impulse lines precisely without being affected by the flow rate of fluid. Accordingly, since it is not required to change a threshold value or a setting value of the standard fluctuation variance Vas depending on the flow rate of fluid, an operator's work load can be prevented from increasing. In addition since it is not required to automate the change of the setting value, apparatus costs can be prevented from increasing.

Although the ratio (=Adps/Adp) of the stand differential pressure mean value Adps in the normal state of the high and low pressure side impulse lines 3 and 4 to the differential pressure data mean value Adp in diagnosis is obtained as the correction value k in this embodiment, the present invention is not limited to this. For example, a ratio (=Tdps/Tdp) of the sum (Tdps) of differential pressure data Dps(i) of the predetermined number of samples obtained similarly in the normal state to the sum (Tdp) of differential pressure data Dp(i) of the predetermined number of samples obtained in time-series in an actual operation (diagnosis) may be obtained as the correction value k.

As described above, the impulse line-logging detecting apparatus according to the present embodiment sets the ratio of the standard differential pressure mean value Adps beforehand obtained in the normal state to the differential pressure data mean value Adp obtained in diagnosis, as the correction value k (=Adps/Adp), and correct the change of the variance ratio D, which is caused by the change of the flow rate, by using the correction value k. However, in a general plant, it can not be said that the differential pressure data Dp(i) always remains constant during diagnosis. For example, even in the first diagnosis, a flow rate may be varied from zero to several times or more over an average flow rate, or fluid may intermittently flow depending on the kind of plant.

Figure 3:
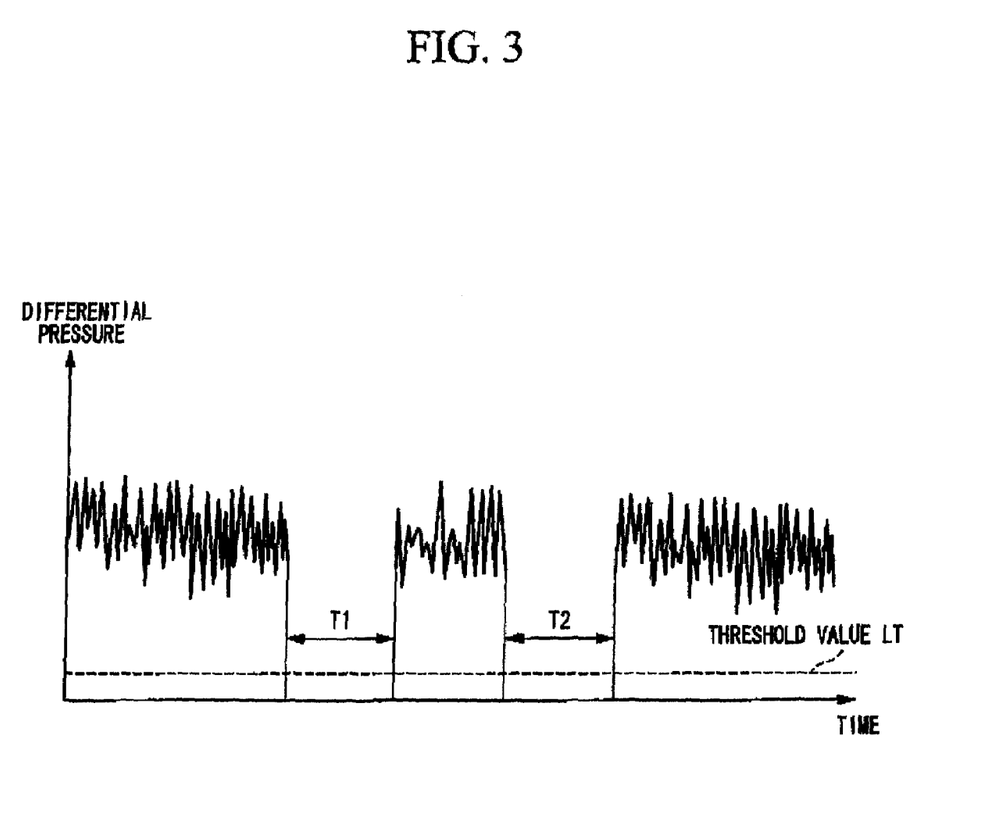
FIG. 3 is a schematic view showing temporal change of differential pressure data Dp(i) under the condition of intermittent flow.

FIG. 3 shows temporal change of the differential pressure data Dp(i) under the condition where fluid flows intermittently (hereinafter referred to as condition of intermittent flow), FIG. 3 shows that fluid does not flow (that is, a flow rate is zero) and differential pressure data Dp(i) is zero in intervals T1 and T2.

Under such a condition of intermittent flow, Since the differential pressure data Dpi) is sampled in to intervals T1 and T2 in which the fluid does not flow and in other intervals in which fluid flows, an error occurs in calculating the differential pressure fluctuation variance Va and the differential pressure data moan value Adp. For example, assuming that the number of samplings of the intervals T1 and T2 in which the fluid does not flow is n and the number of samplings of other intervals in whim the fluid flows is m, when the impulse line-clogging detecting apparatus of this embodiment is used under the condition of intermittent flow, the correction variance ratio Dcomp is expressed by the following equation (10). As can be seen from the equation (10), as the differential pressure fluctuation variance Va becomes smaller in the condition of intermittent flow, the variance ratio D tends to be excessively corrected.

$$Dcomp = 1/\sqrt{\{/(m+n)\}} \cdot k \cdot D \quad (10)$$

As described above, if the flow rate is greatly varied under the condition of intermittent flow, it is difficult to detect the state of clogging of the impulse lines precisely. In this case, it is possible to detect the state of clogging of the impulse lines precisely by using an impulse line-logging detecting apparatus according to a second embodiment of the present invention which will be described below.

Second Embodiment

A construction of an impulse line-clogging detecting apparatus of the second embodiment has the same elements as those of the impulse line-clogging detecting apparatus of the first embodiment shown in FIG. 1, except that the differential pressure transmitter 5 has an additional function which will be described below, and therefore, explanation of the same elements will be omitted. For the sake of convenience of description, a differential pressure transmitter of the second embodiment is denoted by reference numeral 5a to distinguish from the differential pressure transmitter 5 of the first embodiment.

The differential pressure transmitter 5a in the impulse line-clogging detecting apparatus of the second embodiment detects a differential pressure of fluid based on a high pressure transmitted via the high pressure side impulse line 3 and a low pressure transmitted via the low pressure side impulse line 4, compares the detected differential pressure with predetermined threshold value LT, and outputs only differential pressure data Dp(i), which is time-series data representing differential pressure larger than the threshold value LT, to the differential pressure fluctuation calculating unit 6 and the variance ratio correcting unit 9. Here, the threshold value LT is set to be 5% or so of average differential pressure data Dp(i).

Subsequently, an operation of the impulse line-logging detecting apparatus of the second embodiment will be described.

<Setting of Standard Fluctuation Variance Vas and Standard Differential Pressure Mean Value Adps>

To begin with, similar to the first embodiment, in the normal state of the high and low pressure side impulse lines 3 and 4 (that is, a state where the impulse lines arm not clogged), it is required to beforehand obtain the standard fluctuation variance Vas and the standard differential pressure mean value Adps in the first step of an actual operation, based on the differential pressure data Dp(i) obtained in time-series from the differential pressure titter 5a, and store the obtained Vas and Adps in the storing unit 12. The second embodiment is different from the first embodiment in that the differential pressure data Dp(i) obtained in time-series from the differential pressure transmitter 5a is differential pressure data Dp(i) having a value larger than the threshold value LT as described above. In other words, as apparent from FIG. 3, the differential pressure data Dp(i) in only intervals in which fluid flows, other than intervals T1 and T2 in which fluid does not flow, can be obtained from the differential pressure transmitter 5a.

Specifically, in the normal step, that is, under the condition of intermittent flow as shown in FIG. 3, an assuming that the differential pressure data having a value larger than the threshold value LT is Dps(i), which is obtained in time-series from the differential pressure transmitter 5a, the differential pressure fluctuation Fdps(i) is expressed by the above equation (1). In the mean time, the variance (standard fluctuation variance) Vas of the differential pressure fluctuation Fdps(i) is expressed by the above equation (2). In the equation (2), N is the total number of samples of the differential pressure data Dps(i) having a value larger than the threshold value LT. In addition, the standard differential pressure mean value Adps is expressed by the above equation (9). Based on these equations (1), (2) and (9), the standard fluctuation variance Vas and the standard differential pressure mean value Adps are obtained and pre-stored in the storing unit 12.

<Clogging Determination in Actual Operation>

Figure 4:
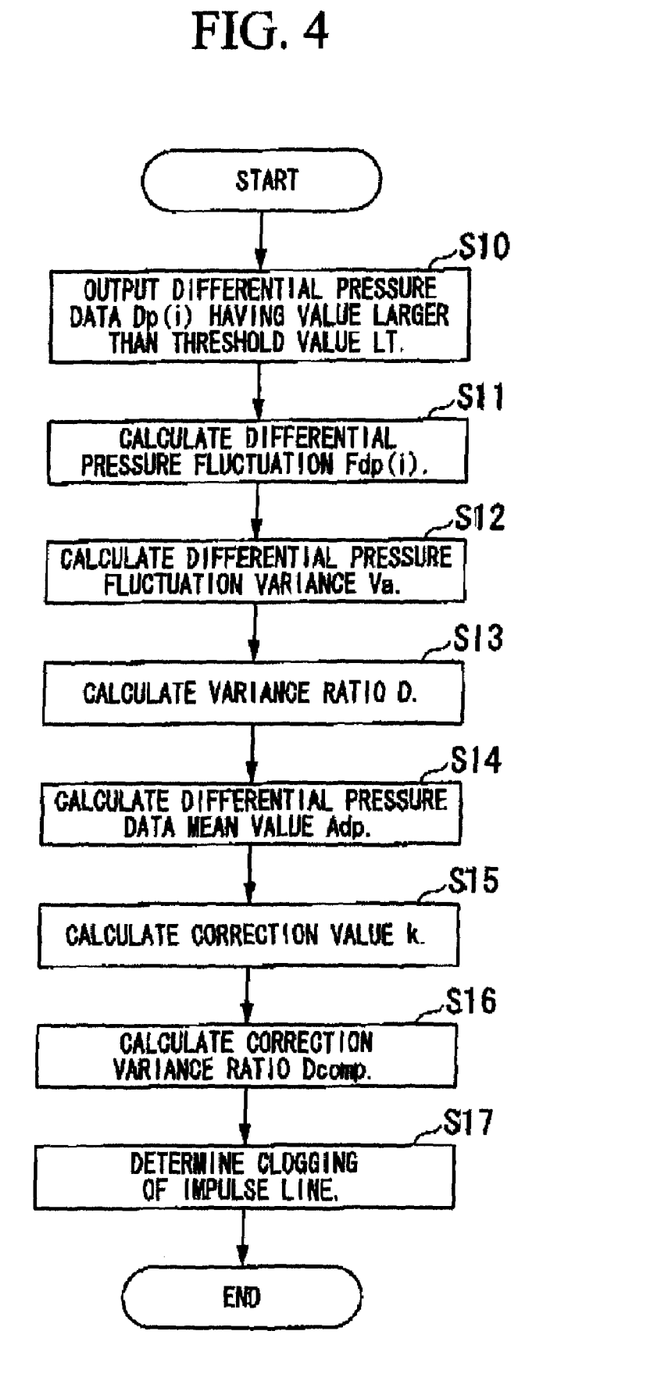
FIG. 4 is a flow chart illustrating an operation of an impulse line-clogging detecting apparatus according to a second embodiment of the present invention.

FIG. 4 is a flow chart illustrating an operation of determining whether or not impulse lines are clogged in an actual operation of a plant (under the condition of intermittent flow). The flow chart illustrated in FIG. 4 is performed whenever diagnosis time for the impulse lines comes. First, the differential pressure transmitter 5a detects a differential pressure of fluid based on a high pressure transmitted via the high pressure side impulse line 3 and a low pressure transmitted via the low pressure side impulse line 4, compares the detected differential pressure with a threshold value LT, and outputs only differential pressure data Dp(i), which is time-series data representing a differential pressure larger than the threshold value LT, to the differential pressure fluctuation calculating unit 6 and the variance ratio collecting unit 9 (Step S10). Here, the differential pressure data Dp(i) in only intervals in which fluid flows, other than intervals T1 and T2 in which fluid does not flow, is output from the differential pressure transmitter 5a.

The differential pressure fluctuation calculating unit 6 calculates differential pressure fluctuation Fdp(i) from the above equation (4) based on the differential pressure data Dp(i), which is obtained in time-series from the differential pressure transmitter 5a and has a value larger than the threshold value LT, and outputs the obtained differential pressure fluctuation Fdp(i) to the fluctuation variance calculating unit 7 (Step S11).

Next, the fluctuation variance calculating unit 7 calculates a variance Va of the differential pressure fluctuation Fdp(i) obtained from the differential pressure fluctuation calculating unit 6, based on the above equation (5), and outputs the obtained differential pressure fluctuation variance Va to the variance ratio calculating unit 8 (Step S12). Next the variance ratio calculating unit 8 calculates a variance ratio D of the differential pressure fluctuation variance Va, which is obtained from the fluctuation variance calculating unit 7, to a standard fluctuation variance Vas in the normal state of the high and low pressure side impulse lines 3 and 4, which is pre-stored in the storing unit 12, based on the above equation (6), and outputs the calculated variance ratio D to the variance ratio correcting unit 9 (Step S13).

Subsequently, the variance ratio correcting unit 9 calculates a differential pressure data mean value Adp from the above equation (7) based on the differential pressure data Dp(i), which is obtained in time-series from the differential transmitter 5a and has a value larger than the threshold value LT (Step S14). Also, the variance ratio correcting unit 9 calculates a ratio of a standard differential pressure mean value Adps in the normal state of the high and low pressure side impulse lines 3 and 4, which is pre-stored in the storing unit 12, to the above-calculated differential pressure data mean value Adp, as a correction value k (=Adps/Adp) (Step S15).

Also, the variance ratio correcting unit 9 calculates a correction variance ratio Dcomp by multiplying the variance ratio 1), which is obtained from the variance ratio correcting unit 9, by the correction value k based on the above equation (9), and outputs the calculated correction variance ratio Dcomp to the clogging determining unit 10 (Step S16). Net, like the first embodiment, the clogging determining unit 10 compares the correction variance ratio Dcomp with a predetermined threshold vale to determine whether or not the high and low pressure side impulse lines 3 and 4 are clogged, and outputs a result of the determination to the display unit 11 (Step S11).

As described above, with the impulse line-clogging detecting apparatus according to the second embodiment, by sampling only the differential pressure data Dp(i) having the value larger than the threshold value LT, even if a flow rate is greatly varied as under the condition of intermittent flow, it is possible to detect the state of clogging of the impulse lines precisely without being affected by the intervals in which fluid does not flow.

Although the equation (4) is used to calculate the differential pressure fluctuation Fdp(i) in the first and second embodiments, the equation (3) may be used instead of the equation (4). By using the equation (3), it is possible to remove a transitional change component which may occur in the differential pressure, thereby making it possible to detect only a real fluctuation component.

In addition, one of the following equations (11) to (13) may be used to calculate the differential pressure fluctuation Fdp (i). These equations (11) to (13) are derived from division of the equation (3) by a currant value, Dp(i), last value Dp(i−1) or the before last value Dp(i−2) of the differential pressure data. By using these equations (11) to (13), it is possible to obtain precise differential pressure fluctuation Fdp(i) without being affected by a transitional change component of a differential pressure or change of a flow rate.

$$Fdp(i)=\{Dp(i)-2\cdot Dp(i-1)+Dp(i-2)\}/Dp(i) \quad (11)$$

$$Fdp(i)=\{Dp(i)-2\cdot Dp(i-1)+Dp(i-2)\}/Dp(i-1) \quad (12)$$

$$Fdp(i)=\{Dp(i)-2\cdot Dp(i-1)+Dp(i-2)\}/Dp(i-2) \quad (13)$$

While preferred embodiments of the present invention have been described and illustrated above, it should be understood that these are exemplary of the invention and are not to be considered as limiting. Additions omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An impulse line-clog detecting apparatus comprising:
a differential pressure detecting unit that detects a differential pressure of a fluid based on a high pressure transmitted via a high pressure side impulse line and a low pressure transmitted via a low pressure side impulse line, and outputs time-series data of the differential pressure;
a differential pressure fluctuation calculating unit that calculates a differential pressure fluctuation based on the time-series data of the differential pressure;
a fluctuation variance calculating unit that calculates a variance of the differential pressure fluctuation;
a variance ratio calculating unit that calculates a variance ratio of the differential pressure fluctuation variance calculated by the fluctuation variance calculating unit to a differential pressure fluctuation variance obtained in advance in a normal state of the high pressure side impulse line and the low pressure side impulse line;
a variance ratio connecting unit that calculates a correction value for suppressing change of the variance ratio, which is caused by change of a flow rate of the fluid, based on the differential pressure time-series data output from the differential pressure detecting unit and time-series data of the differential press obtained in advance in the normal state, and corrects the variance ratio based on the correction value; and
a clogging determining unit that determines whether the high pressure side impulse line and the low pressure side impulse line are clogged, based on the variance ratio corrected by the variance ratio correcting unit.

2. The impulse line-clogging detecting apparatus according to claim 1, wherein
the variance ratio correcting unit calculates a ratio (Adps/Adp) of a differential pressure time-series data mean value (Adps) obtained in advance in the normal state to a differential pressure time-series data mean value (Adp) output from the differential pressure detecting unit, as a correction value, and corrects the variance ratio by multiplying the variance ratio by the correction value.

3. The impulse line-clogging detecting apparatus according to claim 1, wherein
the differential pressure detecting unit compares the detected differential pressure with a predetermined threshold value, and outputs time-series data having a differential pressure larger than the threshold value;
the differential pressure time-series data obtained in advance in the normal state has a value larger than the threshold value; and
the variance of the differential pressure fluctuation obtained in advance in the normal state is calculated based on the differential pressure time-series data which is obtained in advance in the normal state and has the differential pressure larger than the threshold value.

4. The impulse line-clogging detecting apparatus according to claim 1, wherein
the differential pressure fluctuation calculating unit calculates differential pressure fluctuation (Fdp(i)) using one of the following equations (11), (12) and (13) each constituted by a current value (Dp(i)), last value (Dp(i−1)) and time before last value (Dp(i−2)) in the differential pressure time-series data.

$$Fdp(i)=\{Dp(i)-2 \cdot Dp(i-1)+Dp(i-2)\}/Dp(i) \quad (11)$$

$$Fdp(i)=\{Dp(i)-2 \cdot Dp(i-1)+Dp(i-2)\}/Dp(i-1) \quad (12)$$

$$Fdp(i)=\{Dp(i)-2 \cdot Dp(i-1)+Dp(i-2)\}/Dp(i-2) \quad (13)$$

5. An impulse line-clogging detecting method comprising:
a first step of detecting a differential pressure of a fluid based on a high pressure transmitted via a high pressure side impulse line and a low pressure transmitted via a low pressure side impulse line, and outputting time-series data of the differential pressure;
a second step of calculating differential pressure fluctuation based on the time-series data of the differential pressure;
a third step of calculating a variance of the differential pressure fluctuation;
a fourth step of calculating a variance ratio of the differential pressure fluctuation variance calculated in the third step to a differential pressure fluctuation variance obtained in advance in a normal state of the high and low pressure side impulse lines;
a fifth step of calculating a correction value for suppressing Mange of the variance ratio, which is caused by change of a flow rate of the fluid, based on the differential pressure time-series data acquired in the first step and time-series daft of the differential pressure obtained in advance in the normal state;
a sixth step of correcting the variance ratio based on the correction value; and
a seventh step of determining whether the high pressure side impulse line and die low pressure side impulse line are clogged, based on the variance ratio corrected in the sixth step.

* * * * *